(12) United States Patent
Carminati et al.

(10) Patent No.: US 12,066,621 B2
(45) Date of Patent: Aug. 20, 2024

(54) MEMS DEVICE WITH TILTABLE STRUCTURE AND IMPROVED CONTROL

(71) Applicant: STMicroelectronics S.r.l., Agrate Brianza (IT)

(72) Inventors: Roberto Carminati, Piancogno (IT); Nicolo' Boni, Albino (IT); Andrea Barbieri, Casalpusterlengo (IT); Marco Zamprogno, Cesano Maderno (IT); Luca Molinari, Piacenza (IT)

(73) Assignee: STMicroelectron S.r.l., Agrate Brianza (IT)

(*) Notice: Subject to any disclaimer, the term of this patent is extended or adjusted under 35 U.S.C. 154(b) by 277 days.

(21) Appl. No.: 17/720,506

(22) Filed: Apr. 14, 2022

(65) Prior Publication Data

US 2022/0334378 A1    Oct. 20, 2022

(30) Foreign Application Priority Data

Apr. 16, 2021 (IT) .................... 102021000009635

(51) Int. Cl.
*G02B 26/08* (2006.01)
*H02N 2/02* (2006.01)
*H02N 2/06* (2006.01)

(52) U.S. Cl.
CPC ......... *G02B 26/0858* (2013.01); *H02N 2/028* (2013.01); *H02N 2/062* (2013.01)

(58) Field of Classification Search
CPC ......... G02B 26/0858; B81B 5/00; B81B 7/02; B81B 2201/042; H02N 2/028; H02N 2/062
See application file for complete search history.

(56) References Cited

U.S. PATENT DOCUMENTS

2020/0310110 A1    10/2020  Carminati et al.
2022/0187590 A1*   6/2022   Brunner ............. G02B 26/0858

FOREIGN PATENT DOCUMENTS

CN    108761773 A    11/2018
EP    3715317 A1    3/2020

OTHER PUBLICATIONS

IT Search Report and Written Opinion for priority application, IT Appl. No. 102021000009635, report dated Nov. 30, 2021, 10 pgs.
Gu-Stoppel, Shanshan, et al.: "PZT-Actuated and—Sensed Resonant Micromirrors With Large Scan Angles Applying Mechanical Leverage Amplification for Biaxial Scanning," Micromachines 2017, 8, 215; doi:10.3390/mi8070215, 14 pgs.

* cited by examiner

*Primary Examiner* — Emily P Pham
(74) *Attorney, Agent, or Firm* — Crowe & Dunlevy, LLC (57) ABSTRACT

A MEMS device includes a semiconductor body with a cavity and forming an anchor portion, a tiltable structure elastically suspended over the cavity, first and second support arms to support the tiltable structure, and first and second piezoelectric actuation structures biasable to deform mechanically, generating a rotation of the tiltable structure around a rotation axis. The piezoelectric actuation structures carry first and second piezoelectric displacement sensors. When the tiltable structure rotates around the rotation axis, the displacement sensors are subject to respective mechanical deformations and generate respective sensing signals in phase opposition to each other, indicative of the rotation of the tiltable structure. The sensing signals are configured to be acquired in a differential manner.

21 Claims, 6 Drawing Sheets

MEMS DEVICE WITH TILTABLE STRUCTURE AND IMPROVED CONTROL

PRIORITY CLAIM

This application claims the priority benefit of Italian application for Patent No. 102021000009635, filed on Apr. 16, 2021, the content of which is hereby incorporated by reference in its entirety to the maximum extent allowable by law.

TECHNICAL FIELD

This disclosure relates to a MEMS device with tiltable structure and improved control. In particular, this disclosure relates to a MEMS device, an electronic apparatus including the MEMS device, and a method of using the MEMS device. In greater detail, this disclosure relates to a micro-mirror having its tiltable structure piezoelectrically controlled and including piezoelectric sensors configured to sense differential sensing signals in phase opposition to each other.

BACKGROUND

MEMS devices are known as having a mirror structure made using semiconductor material technology.

These micro-electro-mechanical (MEMS) devices are, for example, used in portable apparatuses, such as portable computers, laptops, notebooks (including ultra-thin notebooks), PDAs, tablets, and smartphones. These MEMS devices are used for optical applications, and in particular are used to direct light radiation beams generated by a light source in on-screen or LIDAR-type display applications in desired manners.

Due to their small size, these devices allow compliance with stringent requirements regarding space occupation, in terms of area and thickness.

For example, micro-electro-mechanical mirror devices are used in miniaturized projectors modules (so-called picoprojectors), capable of generating desired light patterns, for example to project images from a distance.

Micro-electro-mechanical mirror devices generally include a mirror element suspended over a cavity and made from a body of semiconductor material so as to be movable, typically with tilt or rotation movement, to direct the incident light beam in a desired manner. Generally, the mirror element is controlled and rotated by actuators of piezoelectric or capacitive type.

In order to allow a better control of the mirror element and, consequently, of the light beam directed thereby, it is known to couple one or more sensors configured to sense the position of the mirror element to the mirror element. This allows the mirror element, for example, to be controlled in closed-loop mode by operating the actuators according to the sensed position of the mirror element. As a result, the use of sensors allows a more accurate control of the position of the mirror element.

To this end, the use of piezoresistive sensors or of a single-ended reading piezoelectric sensor is known.

In particular, piezoresistive sensors include sensing elements of semiconductor material (e.g., silicon) whose electrical resistance is a function of a mechanical deformation of these sensing elements. As a result, when the actuators generate a movement of the mirror element, they also cause the mechanical deformation of the sensing elements which is sensed as a voltage/current variation across the sensing elements. However, the piezoresistive sensors have reduced measure sensitivities (e.g., lower than approximately 3 mV/deg), utilize additional manufacturing steps and therefore higher production costs and times, and are highly dependent on temperature variations (e.g., −0.25%/° C.). Because of this, the use of piezoresistive sensors involves complex calibration procedures to balance the thermal effects to which these sensors may be subject, and in general causes measurement accuracy to be limited.

Instead, the piezoelectric sensor comprises a respective sensing element of insulating material (e.g., lead zirconate titanate, PZT, or aluminum nitride, AlN) which biases, thus generating a potential difference thereacross, when subject to a mechanical deformation generated by the actuators to control the mirror element. Known approaches along these lines include acquiring this potential difference in single-ended mode, that is, amplifying the potential difference, converting it into a respective digital signal through an ADC converter, and using this digital signal to determine the position of the mirror element and/or to control the position in closed-loop. However, the digital signal thus obtained is sensitive to mechanical modes of the MEMS device and is dependent on electrical disturbances and measurement noise, and therefore this type of sensing has a reduced signal-to-noise ratio.

There is a need in the art for a MEMS device, an electronic apparatus including the MEMS device, and a method of using the MEMS device, each of which overcomes the drawbacks of the prior art.

SUMMARY

In an embodiment, a MEMS device includes a semiconductor body defining a cavity and forming an anchor portion, a tiltable structure elastically suspended on the cavity, and first and second support arms extending between the anchor portion and opposite sides of the tiltable structure, along a rotation axis of the tiltable structure. The MEMS device also includes first and second piezoelectric actuation structures which face opposite sides of the first support arm, extend between the anchor portion and the opposite sides of the first support arm or between the anchor portion and the tiltable structure, and are biasable to deform mechanically, thus generating a rotation of the tiltable structure around the rotation axis. The first and second piezoelectric actuation structures carry first and second displacement sensors of piezoelectric type which are opposite to each other with respect to the rotation axis. When the tiltable structure rotates around the rotation axis due to the first and second piezoelectric actuation structures, the first and second displacement sensors are subject to respective mechanical deformations and generate first and second sensing signals which are in phase opposition to each other and are indicative of the rotation of the tiltable structure around the rotation axis. The first and second sensing signals are configured to be acquired in a differential manner.

A method described of using the MEMS device described above is also disclosed herein. The method includes biasing the first and second piezoelectric actuation structures to generate the rotation of the tiltable structure around the rotation axis, and acquiring, in a differential manner, the first and second sensing signals generated by the first and second displacement sensors.

BRIEF DESCRIPTION OF THE DRAWINGS

For a better understanding, a preferred embodiment is now described, purely by way of non-limiting example, with reference to the attached drawings, wherein.

DETAILED DESCRIPTION

Elements common to the different embodiments of this disclosure, described hereinafter, are indicated with the same reference numbers.

Figure 1:
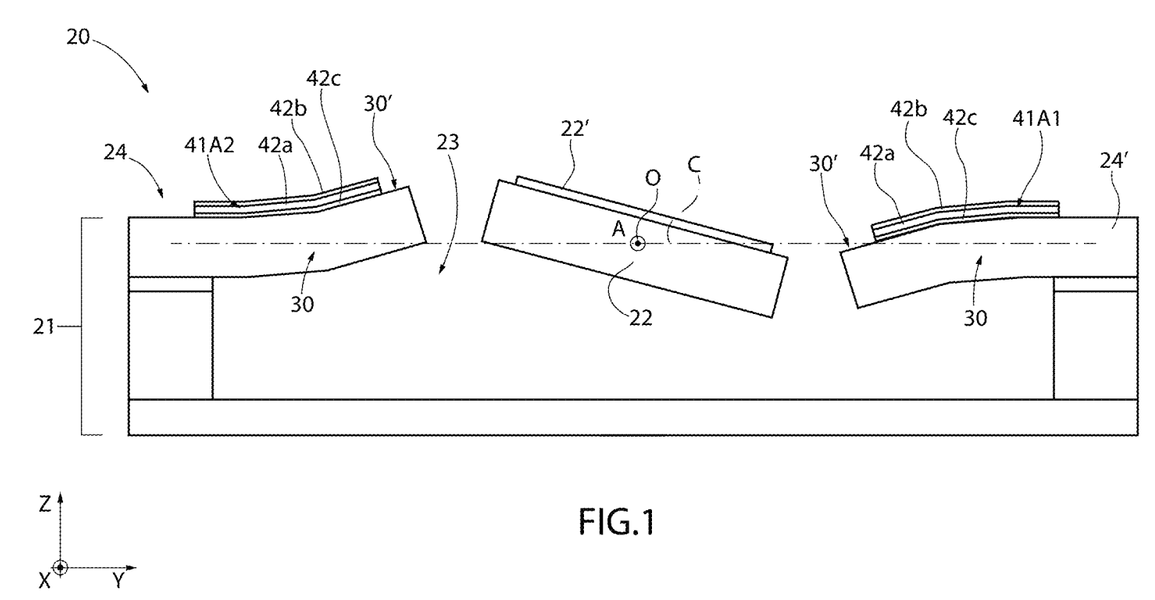
FIG. 1 schematically depicts a lateral cross-section view with suspended parts of a MEMS device provided with a tiltable structure.

FIG. 1 schematically shows, in a lateral cross-section view in a Cartesian (triaxial) reference system of axes X, Y, Z, a MEMS device 20. The MEMS device 20 may be a mirror device.

The MEMS device 20 is formed in a semiconductor body 21. For example, the semiconductor body 21 may be a die of semiconductor material, in particular mono or polycrystalline silicon, or a double structural layer, for example formed by one SOI (Silicon On Insulator) wafer.

The MEMS device 20 is provided with a tiltable structure 22 having a main extension in a XY horizontal plane, defined by the X and Y axes, and arranged so as to rotate around a rotation axis A, parallel to the X axis.

The rotation axis A also represents a first median axis of symmetry for the MEMS device 20, therefore also indicated with A; a second median axis of symmetry C for the MEMS device 20 is parallel to the Y axis and passes through a center O of the tiltable structure 22.

The tiltable structure 22 is suspended above a cavity 23 formed in the semiconductor body 21 by a fixed structure 24 of the semiconductor body 21. The tiltable structure 22 carries at its top a reflective surface 22' so as to define a mirror structure. The reflective surface 22' is of a suitable material, for example aluminum, or gold, depending on whether the projection is in the visible or in the infrared.

The tiltable structure 22 is elastically coupled to an anchor structure, here formed by a frame portion 24' of the fixed structure 24, through a support structure comprising first and second support arms, not shown in FIG. 1, as extending longitudinally along the first median axis of symmetry A, above the cavity 23, between the frame portion 24' of the fixed structure 24 and the tiltable structure 22, from opposite parts thereof. The support arms are equal to each other and arranged symmetrically with respect to the second median axis of symmetry C.

Figure 2:
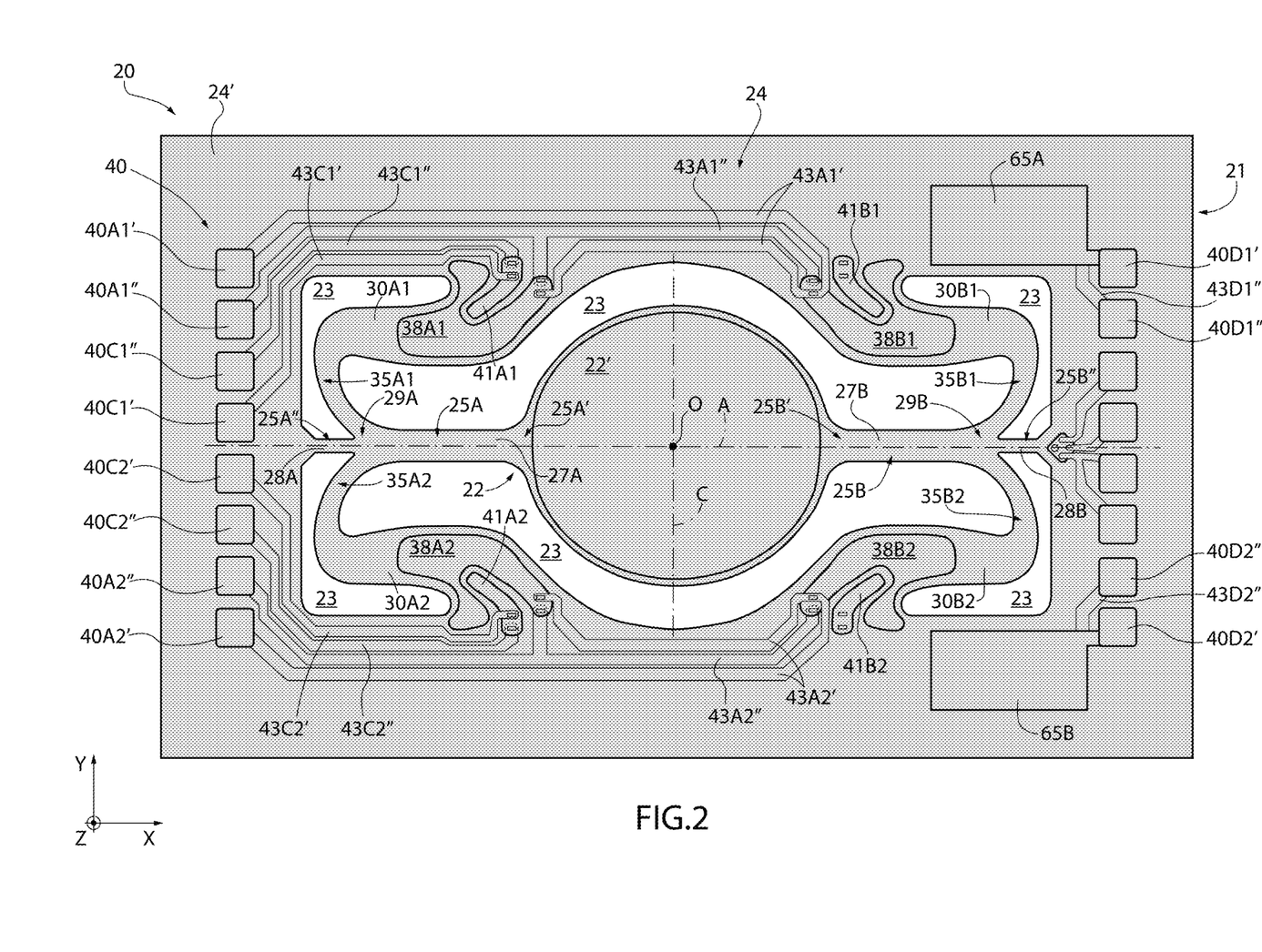
FIGS. 2-4 are top views of respective embodiments of the MEMS device of FIG. 1.

The MEMS device 20 also comprises a plurality of actuation structures 30 which, as shown in greater detail in FIG. 2, extend between the frame portion 24' of the fixed structure 24 and the support structure, on sides of the latter which are opposite to each other along the Y axis and having respective actuation structures 30 facing thereto. In particular, the actuation structures 30 have a symmetrical structure with respect to the first median axis of symmetry A.

The actuation structures 30 are suspended above the cavity 23 and carry, at top surfaces 30' thereof (not facing the cavity 23), respective piezoelectric actuator elements, not shown in FIG. 1, that are electrically controllable to cause a mechanical deformation of the actuation structures which induces a torsion of the support arms around the first median axis of symmetry A and, therefore, a displacement of the mirror structure (in detail, a rotation of the tiltable structure 22 around the first median axis of symmetry A). Furthermore, the MEMS device 20 comprises a plurality of displacement sensors (indicated in FIG. 1 with the references 41A1 and 41A2, as better described below) of piezoelectric type which are galvanically insulated with respect to the piezoelectric actuator elements, are carried by the actuation structures 30 in a symmetrical manner with respect to the first median axis of symmetry A (in particular they extend on the top surfaces 30' of the actuation structures 30), and are suspended on the cavity 23.

In detail, each displacement sensor comprises a respective piezoelectric layer 42a (in detail, of piezoelectric material, and in greater detail of insulating and piezoelectric material such as PZT or AlN) interposed, along the Z axis (i.e. orthogonally to the top surface 30' of the respective actuation structure 30 having the displacement sensor arranged thereon), between a respective top electrode 42b and a respective bottom electrode 42c, the latter being in contact with the top surface 30' of the respective actuation structure 30 and having the displacement sensor arranged thereon. In other words, for each displacement sensor, the piezoelectric layer 42a has first and second surfaces opposite to each other along the Z axis, where the top electrode 42b is in contact with the first surface and the bottom electrode 42c is in contact with the second surface. Each displacement sensor thus forms a respective capacitor, where the top electrode 42b and the bottom electrode 42c (for example both of metal material such as platinum) are frames or plates of the capacitor. In use, for each displacement sensor, the mechanical deformation of the actuation structures 30 caused by the piezoelectric actuator elements generates a corresponding mechanical deformation in the displacement sensors and therefore, due to the direct piezoelectric effect, there is generated an accumulation of charge of opposite signs at the first and second surfaces of the piezoelectric layer 42a (in particular, positive charges at the interface with the bottom/top electrode where the crystal lattice is subject to compression and negative charges at the interface with the top/bottom electrode where the crystal lattice is subject to expansion), and therefore a potential difference between the top electrode 42b and the bottom electrode 42c. As a result, each displacement sensor generates a respective sensing signal (i.e. such potential difference) which is correlated to the rotation of the tiltable structure 22 around the rotation axis A and which is provided outside the MEMS device 20, as better discussed hereinafter with reference to FIG. 5.

In greater detail, the MEMS device 20 comprises at least a first displacement sensor 41A1 and a second displacement sensor 41A2 arranged on the actuation structures 30, from parts opposite to each other with respect to the first median axis of symmetry A. Since the first and second displacement sensors 41A1, 41A2 are arranged symmetrically with respect to the first median axis of symmetry A, they are subject to deformation movements along the Z axis which are opposite to each other: for example, if the first surface of the piezoelectric layer 42a of the first displacement sensor 41A1 is subject to compression of the crystal lattice and the second surface of the piezoelectric layer 42a of the first displacement sensor 41A1 is subject to expansion of the crystal lattice, then the first surface of the piezoelectric layer 42a of the second displacement sensor 41A2 is subject to expansion of the crystal lattice and the second surface of the piezoelectric layer 42a of the second displacement sensor 41A2 is subject to compression of the crystal lattice. As a result, the accumulation of charges on the first and second surfaces of the piezoelectric layer 42a is opposite for the first and second displacement sensors 41A1, 41A2, and the respective sensing signals generated thereby are in phase opposition (counterphase) to each other and may be acquired in a differential manner, as better described hereinafter with reference to FIG. 6.

Figure 3:
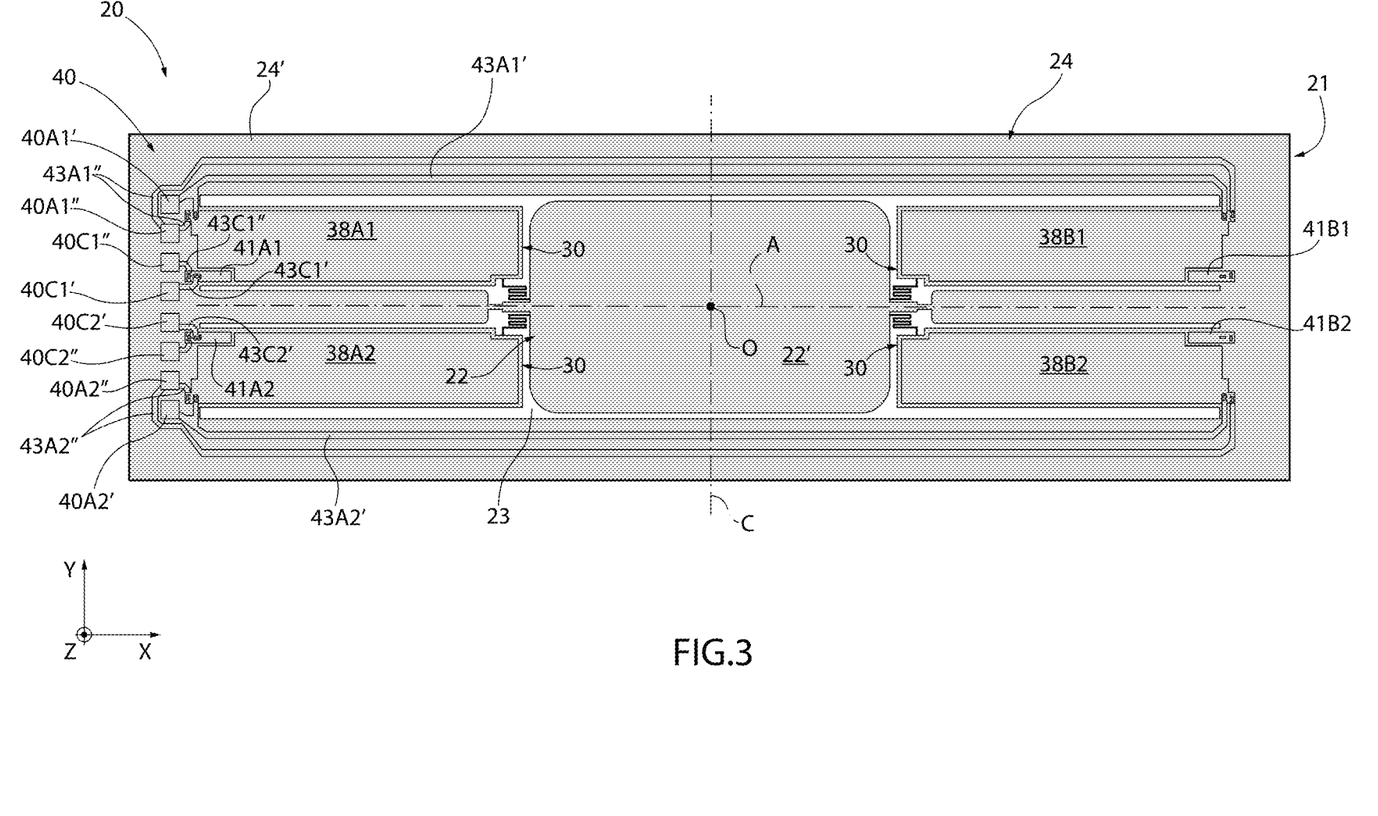

As an alternative to what has been previously discussed, as shown for example in FIG. 3, the actuation structures 30 may extend between the frame portion 24' of the fixed structure 24 and the tiltable structure 22 so as to face said sides of the support structure opposite to each other along the Y axis. In particular, the actuation structures 30 have a symmetrical structure with respect to the first median axis of symmetry A and to the second median axis of symmetry C. In this case, therefore, the actuation structures 30 are directly coupled to the tiltable structure 22, and are not instead directly coupled to the support structure.

FIG. 2 schematically shows the MEMS device 20, according to an embodiment similar to that shown in FIG. 1 and wherein the MEMS device 20 is designed to operate in dynamic regime (i.e. in resonance, at rotation frequencies of the tiltable structure 22 which are higher than 10 kHz).

The MEMS device 20 is formed in the semiconductor body 21 and is provided with the tiltable structure 22.

The tiltable structure 22 is suspended above the cavity 23 and carries at its top the reflective surface 22' which has, in the illustrated embodiment, a generally circular shape in the XY plane (although other shapes are possible, from an elliptical shape to a polygonal shape, for example square or rectangular).

The tiltable structure 22 is elastically coupled to the frame portion 24' of the fixed structure 24 through the support structure comprising the first and second support arms, indicated in FIG. 2 with the references 25A, 25B. The support arms 25A, 25B extend longitudinally along the first median axis of symmetry A, above the cavity 23, between the frame portion 24' of the fixed structure 24 and the tiltable structure 22, from opposite parts thereof. The support arms 25A, 25B are equal to each other and arranged symmetrically with respect to the second median axis of symmetry C.

In detail, the first support arm 25A has a first end 25A' rigidly coupled to the tiltable structure 22 and a second end 25A'' rigidly coupled to the frame portion 24' of the fixed structure 24 and comprises first and second torsional springs 27A, 28A. The first and second torsional springs 27A, 28A have a linear shape, extending in continuation with each other along the first median axis of symmetry A between a first side of the tiltable structure 22 and a first side of the frame portion 24' of the fixed structure 24.

The second support arm 25B has a first end 25B' rigidly coupled to the tiltable structure 22 and a second end 25B'' rigidly coupled to the frame portion 24' of the fixed structure 24 and comprises third and fourth torsional springs 27B, 28B. The third and fourth torsional springs 27B, 28B extend in continuation with each other along the first median axis of symmetry A between a second side, opposite to the first, of the tiltable structure 22 and a second side, opposite to the first, of the frame portion 24' of the fixed structure 24.

In detail, the torsional springs 27A, 27B, 28A, 28B each have a linear beam shape rigid to movements outside the XY plane and yielding to the torsion around the first median axis of symmetry A.

In the first support arm 25A, the first and second torsional springs 27A, 28A are connected to each other at a first constraint structure 29A, which is rigid; in the second support arm 25B, the third and fourth torsional springs 27B, 28B are connected to each other at a second constraint structure 29B, which is rigid.

The MEMS device 20 further comprises the plurality of actuation structures 30 of resonant type, and in particular at least one first actuation structure 30A1 and a second actuation structure 30A2, extending between the frame portion 24' of the fixed structure 24 and the first constraint structure 29A, on a first and, respectively, a second side of the first support arm 25A, and have a symmetrical structure with respect to the first median axis of symmetry A. In detail, the first actuation structure 30A1 is coupled to the first constraint structure 29A through a coupling region 35A1 of the first actuation structure 30A1, which extends along a direction of main extension transverse with respect to a direction of main extension of the remaining portion of the first actuation structure 30A1; similarly, the second actuation structure 30A2 is coupled to the first constraint structure 29A through a coupling region 35A2 of the second actuation structure 30A2, which extends along a respective direction of main extension transverse with respect to a direction of main extension of the remaining portion of the second actuation structure 30A2.

The plurality of actuation structures 30 further comprises third and fourth actuation structures 30B1 and 30B2, extending between the frame portion 24' of the fixed structure 24 and the second constraint structure 29B, on a first and, respectively, a second side of the second support arm 25B. The third and fourth actuation structures 30B1 and 30B2 have a structure symmetrical to each other with respect to the first median axis of symmetry A. In detail, the third actuation structure 30B1 is coupled to the second constraint structure 29B through a coupling region 35B1 of the third actuation structure 30B1, which extends along a respective direction of main extension transverse with respect to a direction of main extension of the remaining portion of the third actuation structure 30B1; similarly, the fourth actuation structure 30B2 is coupled to the second constraint structure 29B through a coupling region 35B2 of the fourth actuation structure 30B2 which extends along a respective direction of main extension transverse with respect to a direction of main extension of the remaining portion of the fourth actuation structure 30B2.

The actuation structures 30A1, 30A2, 30B1 and 30B2 are suspended above the cavity 23 and carry, at the top surfaces 30' thereof, the respective piezoelectric actuator elements, indicated in FIG. 2 with the references 38A1, 38A2, 38B1, 38B2. In particular, the piezoelectric actuator elements 38A1, 38A2, 38B1, 38B2 are based on the reverse piezoelectric effect and have a structure similar to the displacement sensors (therefore each of them comprises, in a manner not shown in FIG. 2, the respective piezoelectric layer $42a$, the respective top electrode $42b$ and the respective bottom electrode $42c$), and therefore are not further described herein.

Furthermore, the MEMS device 20 comprises the plurality of displacement sensors, and in particular comprises the first and second displacement sensors 41A1 and 41A2. The first and second displacement sensors 41A1 and 41A2 extend for example on the first and, respectively, on the second actuation structures 30A1, 30A2 (alternatively and in a manner not shown, they extend on the third and, respectively, on the fourth actuation structures 30B1, 30B2), in particular on the top surfaces 30' thereof. For example, the first and second displacement sensors 41A1 and 41A2 extend at the frame portion 24' of the fixed structure 24.

Optionally, the plurality of displacement sensors also comprises third and fourth displacement sensor 41B1 and 41B2 extending on the third and, respectively, on the fourth actuation structures 30B1, 30B2, in particular on the top surfaces 30' thereof. For example, the third and fourth displacement sensors 41B1 and 41B2 extend at the frame portion 24' of the fixed structure 24.

Furthermore, the MEMS device 20 optionally comprises a plurality of electrical contact pads 40, carried by the frame portion 24' of the fixed structure 24 and electrically connected to the piezoelectric actuator elements 38A1, 38A2, 38B1, 38B2, to allow the electrical bias through actuation signals coming from the outside of the MEMS device 20 (better discussed hereinafter with reference to FIG. 5), and electrically connected to the first and second displacement sensors 41A1 and 41A2 (optionally, also to the third and fourth displacement sensors 41B1 and 41B2, if present), to allow the respective potential differences to be sensed. In particular, the pads 40 comprise: a first pad of first actuator 40A1' electrically connected, through a first conductive via of first actuator 43A1', to the top electrodes 42b of the piezoelectric actuator elements 38A1 and 38B1; a second pad of first actuator 40A1" electrically connected, through a second conductive via of first actuator 43A1", to the bottom electrodes 42c of the piezoelectric actuator elements 38A1 and 38B1; a first pad of first sensor 40C1' electrically connected, through a first conductive via of first sensor 43C1', to the top electrode 42b of the first displacement sensor 41A1; a second pad of first sensor 40C1" electrically connected, through a second conductive via of first sensor 43C1", to the bottom electrode 42c of the first displacement sensor 41A1; a first pad of second actuator 40A2' electrically connected, through a first conductive via of second actuator 43A2', to the top electrodes 42b of the piezoelectric actuator elements 38A2 and 38B2; a second pad of second actuator 40A2" electrically connected, through a second conductive via of second actuator 43A2", to the bottom electrodes 42c of the piezoelectric actuator elements 38A2 and 38B2; a first pad of second sensor 40C2' electrically connected, through a first conductive via of second sensor 43C2', to the top electrode 42b of the second displacement sensor 41A2; and a second pad of second sensor 40C2" electrically connected, through a second conductive via of second sensor 43C2", to the bottom electrode 42c of the second displacement sensor 41A2.

Optionally, the MEMS device 20 further comprises first and second integrated capacitors 65A and 65B, integrated in the semiconductor body 21, for example in the fixed structure 24. In a manner not shown in FIG. 2, each integrated capacitor 65A, 65B comprises a respective top plate, a respective bottom plate (e.g., of metal material), and a respective dielectric layer interposed, along the Z axis, between the bottom plate and the top plate. For example, in this case the pads 40 further comprise: a first pad of first capacitor 40D1' electrically connected to the top plate of the first integrated capacitor 65A; a second pad of first capacitor 40D1" electrically connected, through a conducive via of first capacitor 43D1", to the bottom plate of the first integrated capacitor 65A; a first pad of second capacitor 40D2' electrically connected to the top plate of the second integrated capacitor 65B; and a second pad of second capacitor 40D2" electrically connected, through a conducive via of second capacitor 43D2", to the bottom plate of the second integrated capacitor 65B. The use of the integrated capacitors 65A and 65B is described hereinafter, with reference to FIG. 6.

FIG. 3 schematically shows the MEMS device 20, according to a further embodiment wherein the MEMS device 20 is designed to operate in quasi-static (i.e., at rotation frequencies of the tiltable structure 22 which are lower than approximately 200 Hz). In particular, the structure of the MEMS device of FIG. 3 is similar to that of FIG. 2, and therefore it is not described again in detail herein.

However, in FIG. 3, the actuation structures 30 extend between the frame portion 24' of the fixed structure 24 and the tiltable structure 22, on sides of the latter which are opposite to each other along the X axis. Therefore, the actuation structures 30 are directly coupled to the tiltable structure 22 and are not instead directly coupled to the support structure as described with reference to FIG. 2.

Figure 4:
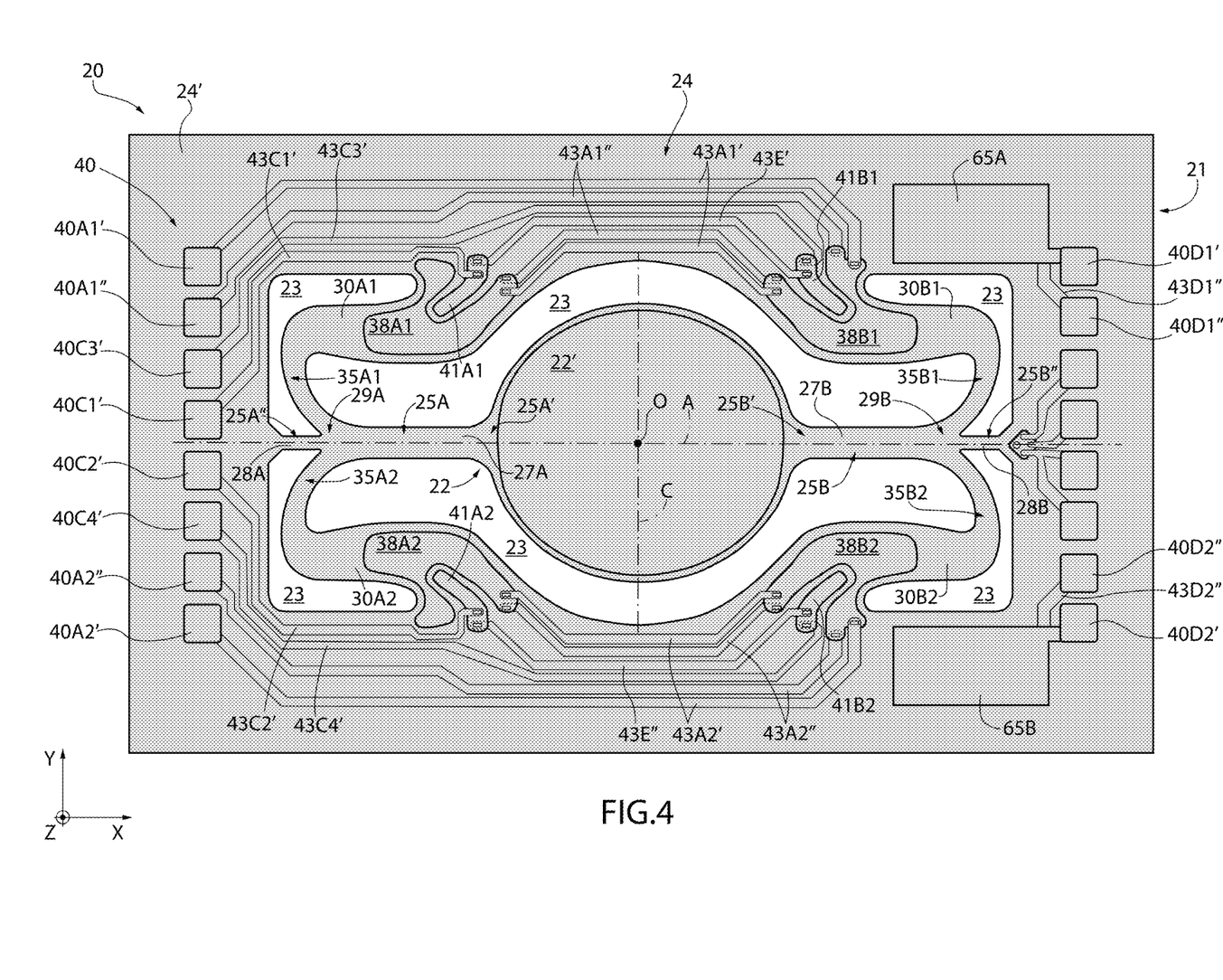

FIG. 4 schematically shows the MEMS device 20, according to a further embodiment. In particular, the structure of the MEMS device of FIG. 4 is similar to that of FIG. 2, and therefore it is not described again in detail herein.

However, in FIG. 4, the third and fourth displacement sensors 41B1 and 41B2, which are electrically arranged in series with the first and, respectively, the second displacement sensors 41A1 and 41A2 are also present. In other words, the capacitors formed by the first and third displacement sensors 41A1 and 41B1 are in series with each other, and the capacitors formed by the second and fourth displacement sensors 41A2 and 41B2 are in series with each other. In particular, the bottom electrode 42c of the first displacement sensor 41A1 is electrically connected, through a first common conductive via of sensor 43E', to the top electrode 42b of the third displacement sensor 41B1 and, similarly, the bottom electrode 42c of the second displacement sensor 41A2 is electrically connected, through a second common conductive via of sensor 43E", to the top electrode 42b of the fourth displacement sensor 41B2.

Furthermore, in FIG. 4, the second pad of first sensor 40C1", the second conductive via of first sensor 43C1", the second pad of second sensor 40C2", and the second conductive via of second sensor 43C2" are absent. In lieu thereof, the pads 40 comprise: a first pad of third sensor 40C3' electrically connected, through a first conductive via of third sensor 43C3', to the bottom electrode 42c of the third displacement sensor 41B1; and a first pad of fourth sensor 40C4' electrically connected, through a first conductive via of fourth sensor 43C4', to the bottom electrode 42c of the fourth displacement sensor 41B2.

Figure 5:
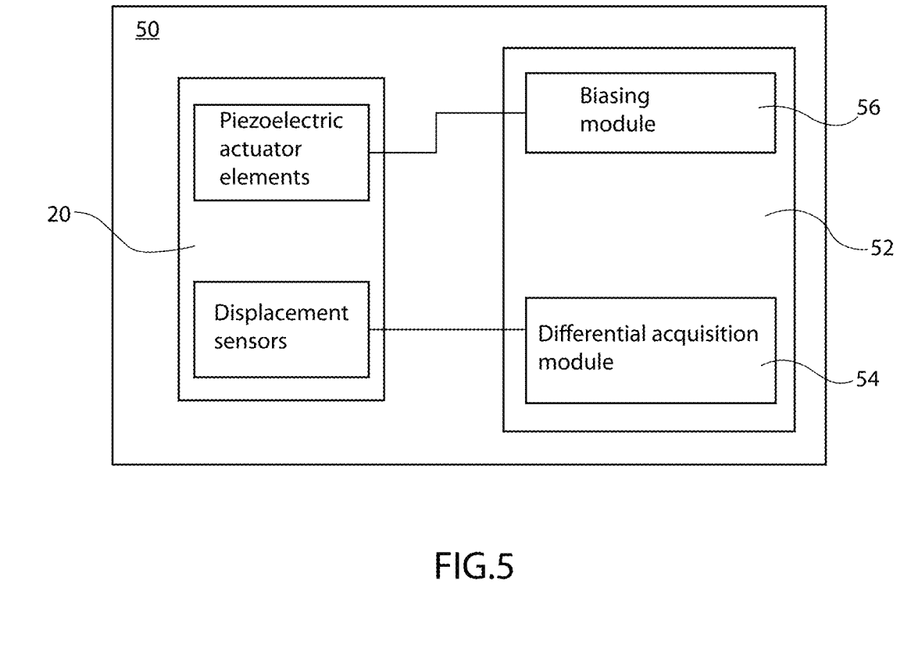
FIG. 5 is a block diagram schematically showing an electronic apparatus including the MEMS device of FIG. 1.

FIG. 5 shows an electronic apparatus 50 (e.g., a laser projector for "Virtual Retinal Display", VRD) comprising the MEMS device 20 according to any of the previously described embodiments, and a control unit 52 (e.g., an electronic processing circuit such as an ASIC—Application Specific Integrated Circuit) coupled to the MEMS device 20.

In particular, the control unit 52 comprises a differential acquisition module 54 electrically coupled to the displacement sensors 41A1, 41A2, 41B1, 41B2 to receive the respective sensing signals therefrom and to process the latter in a differential manner. In detail, the sensing signals are acquired, in a differential manner, by the differential acquisition module 54 which, on the basis of the sensing signals, generates a respective displacement signal indicative of the sensed displacement of the tiltable structure 22 at output.

Optionally, the control unit 52 further comprises a biasing module 56 electrically coupled to the piezoelectric actuator elements 38A1, 38A2, 38B1, 38B2 to send the respective actuation signals thereto and thus control the rotation of the tiltable structure 22.

For example, the actuation signals are generated, according to closed-loop control techniques, as a function of the displacement signal generated by the differential acquisition module 54.

Additionally, or alternatively, the displacement signal may be used to verify the correct operation of the MEMS device 20 (i.e. the correct position of the tiltable structure 22 with respect to a target position). This allows the light beam deflected by the tiltable structure 22 to be controlled, thus ensuring the correct angular scanning performed by the MEMS device 20; furthermore, in VRD applications, this prevents the light beam incident on the tiltable structure 22 from being generated when the tiltable structure 22 is not moving, which might cause light emission beyond the safety thresholds for the human eye.

Figure 6:
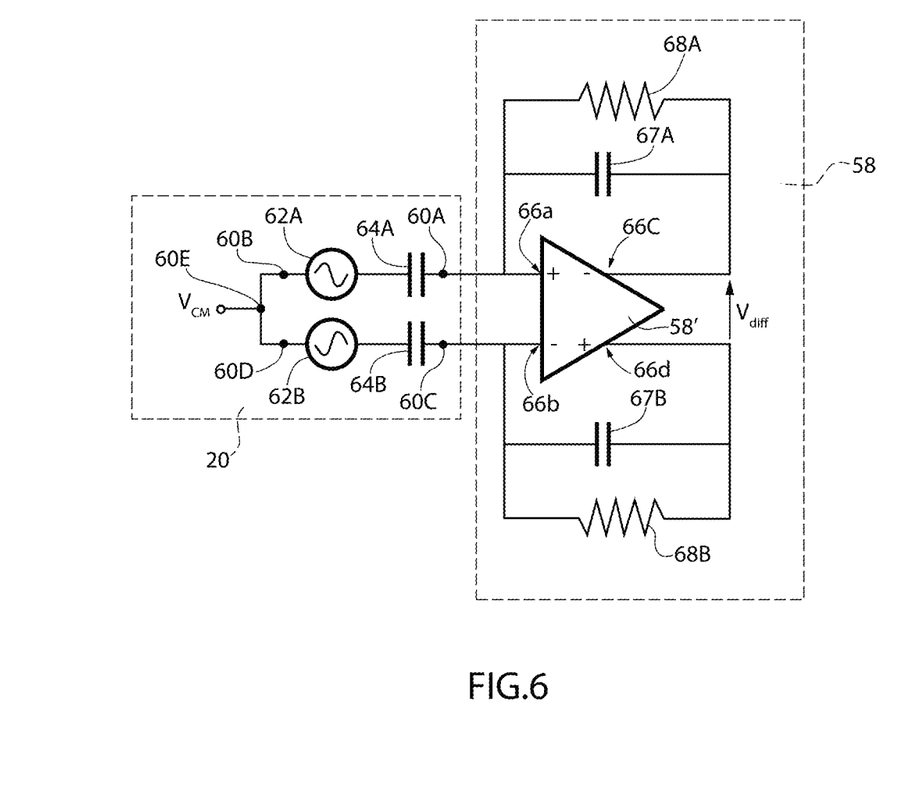
FIG. 6 is an electrical circuit schematically showing a differential acquisition circuit of the electronic apparatus of FIG. 5.

FIG. 6 shows a differential acquisition circuit 58 comprised in the differential acquisition module 54 and electrically coupled to the MEMS device 20.

In particular, the MEMS device 20 is represented by an equivalent electrical circuit which comprises: a first series circuit of a first voltage generator 62A and a first capacitor 64A, which extends between a first node 60A and a second node 60B; and a second series circuit of a second voltage generator 62B and a second capacitor 64B, which extends between a third node 60C and a fourth node 60D. Considering the cases of FIGS. 2 and 3, the nodes 60A, 60B, 60C and 60D correspond, respectively, to the first pad of first sensor 40C1', to the second pad of first sensor 40C1", to the first pad of second sensor 40C2', and to the second pad of second sensor 40C2". Considering the case of FIG. 4, the nodes 60A, 60B, 60C and 60D correspond, respectively, to the first pad of first sensor 40C1', to the first pad of third sensor 40C3', to the first pad of second sensor 40C2', and to the first pad of fourth sensor 40C4'.

In the embodiments of FIGS. 2 and 3 wherein the sensing signals are generated by the first and second displacement sensors 41A1, 41A2, the first voltage generator 62A generates a voltage $V_{sense1}$ which is equal to the potential difference (indicated hereinafter with $V_{A1}$) generated by the first displacement sensor 41A1, the second voltage generator 62B generates a voltage $V_{sense2}$ which is equal to the potential difference (indicated hereinafter with $V_{A2}$) generated by the second displacement sensor 41A2, the first capacitor 64A has a capacitance $C_{PS1}$ equal to a capacitance Cal of the first displacement sensor 41A1, and the second capacitor 64B has a capacitance $C_{PS2}$ equal to a capacitance $C_{A2}$ of the second displacement sensor 41A2.

In the embodiment of FIG. 4 wherein the sensing signals are generated by the displacement sensors 41A1, 41A2, 41B1 and 41B2, the first voltage generator 62A generates the voltage $V_{sense1}$ which is equal to the sum of the potential difference $V_{A1}$ generated by the first displacement sensor 41A1 and of the potential difference (indicated hereinafter with $V_{B1}$) generated by the third displacement sensor 41B1, the second voltage generator 62B generates the voltage $V_{sense2}$ which is equal to the sum of the potential difference $V_{A2}$ generated by the second displacement sensor 41A2 and of the potential difference (indicated hereinafter with $V_{B2}$) generated by the fourth displacement sensor 41B2, the first capacitor 64A has the capacitance $C_{PS1}$ equal to the series (i.e. to the reciprocal of the sum of the reciprocals) of the capacitance $C_{A1}$ of the first displacement sensor 41A1 and of a capacitance $C_{B1}$ of the third displacement sensor 41B1, and the second capacitor 64B has the capacitance $C_{PS2}$ equal to the series of the capacitance $C_{A2}$ of the second displacement sensor 41A2 and of a capacitance $C_{B2}$ of the fourth displacement sensor 41B2.

Furthermore, in FIG. 6, the second and fourth nodes 60B and 60D are shorted to each other and an intermediate node 60E is present therebetween. Optionally, a common mode voltage $V_{CM}$ is applied to the intermediate node 60E and is indicative of a direct common mode voltage supplied to the displacement sensors 41A1 and 41A2 (considering, by way of example, the cases of FIGS. 2 and 3) through the second pad of first sensor 40C1" and, respectively, the second pad of second sensor 40C2", for the reasons described hereinafter. Considering instead the case of FIG. 4, the common mode voltage $V_{CM}$ is indicative of a direct common mode voltage supplied to the displacement sensors 41A1, 41A2 41B1, 41B2 through the first pad of third sensor 40C3' and the first pad of fourth sensor 40C4'. For example, this direct common mode voltage is supplied by the control unit 52 (e.g., by the biasing module 56).

The differential acquisition circuit 58 comprises an operational amplifier of differential type, in particular a fully-differential amplifier (FDA) 58' such as a fully-differential charge amplifier. In detail, the FDA 58' has differential inputs and outputs, and in particular it has a positive input 66a, a negative input 66b, a negative output 66c, and a positive output 66d. The positive input 66a is coupled to the first node 60A and, furthermore, is coupled to the negative output 66c through a first parallel circuit of a first feedback resistor 68A and of a first feedback capacitor 67A. The negative input 66b is coupled to the third node 60C and, furthermore, is coupled to the positive output 66d through a second parallel circuit of a second feedback resistor 68B and of a second feedback capacitor 67B. In particular, the feedback resistors 68A and 68B are to ensure the operation of the FDA 58' even when operating in DC regime. According to an aspect of this disclosure, the first and second feedback capacitors 67A and 67B have first and second feedback capacitances $C_{FB1}$ and $C_{FB2}$ which are equal to each other, the first and second feedback resistors 68A and 68B have first and a second feedback resistances $R_{FB1}$ and $R_{FB2}$ which are equal to each other, and the capacitances $C_{PS1}$ and $C_{PS2}$ of the first and second capacitors 64A and 64B are equal to each other (in greater detail, $C_{A1}=C_{A2}=C_{B1}=C_{B2}$ considering, by way of example, the case of FIG. 4). In this case, a gain of the FDA 58' is proportional to the $C_{PSX}/C_{FB}$ ratio, where $C_{PSX}=C_{PS1}=C_{PS1}$ and $C_{FB}=C_{FB1}=C_{FB2}$.

According to an aspect of this disclosure, the first and second feedback capacitors 67A and 67B are, respectively, the first and second integrated capacitors 65A and 65B, and therefore are integrated in the MEMS device 20.

In use, due to the displacement of the tiltable structure 22, the MEMS device generates the sensing signals. Due to these sensing signals, a differential voltage $V_{diff}$ (or differential signal), which is correlated to the displacement signal, is generated between the negative output 66c and the positive output 66d.

In fact, the displacement signal is obtained, through signal processing techniques, from the differential voltage $V_{diff}$. For example, in a manner not shown, the differential acquisition module 54 further comprises an analog-to-digital converter (ADC) and, optionally, a filtering module to convert the differential voltage $V_{diff}$ into digital form and to filter this signal in the frequency domain, thus obtaining the displacement signal. Furthermore, in a manner not shown, a direct bias voltage is supplied to the FDA 58', in order to bias the latter. Furthermore, since the displacement sensors 41A1, 41A2 (and 41B1, 41B2 if in the case of FIG. 4) generally have respective leakage resistors (not shown and, by way of example, arranged in parallel to the first and, respectively, the second capacitors 64A, 64B), the common mode voltage $V_{CM}$ may be applied in order to stabilize an input common mode voltage of the FDA 58' (not shown and present between the positive input 66a and the negative input 66b of the FDA 58'). In fact, in the absence of the common mode voltage $V_{CM}$, if the leakage resistors have respective resistances that are comparable to the first feedback resistance $R_{FB1}$ and a second feedback resistance $R_{FB2}$ (e.g., they have the same order of magnitude as the feedback resistances $R_{FB1}$ and $R_{FB2}$), the input common mode voltage of the FDA 58' might be subject to variations such that they compromise the optimal operation of the FDA 58'. On the other hand, when the common mode voltage $V_{CM}$ is present and the resistances of the leakage resistors are comparable to the first and second feedback resistances $R_{FB1}$ and $R_{FB2}$, the input common mode voltage of the FDA 58' also depends on the common mode voltage $V_{CM}$ which may be applied to control the input common mode voltage of the FDA 58'.

The advantages of the devices of this disclosure are evident from an understanding of the characteristics of the devices.

In particular, the displacement sensors 41A1, 41A2, 41B1, 41B2 of piezoelectric type and with acquisition of differential type allow the displacements of the tiltable structure 22 to be accurately sensed, due also to their placing from parts opposite with respect to the first median axis of symmetry A which causes the sensing signals to be generated in phase opposition to each other. It is therefore possible to control the movements of the tiltable structure 22 more accurately than using prior art techniques.

The displacement sensors 41A1, 41A2, 41B1, 41B2, being of piezoelectric type, utilize a lower power consumption than that of piezoresistive sensors.

Furthermore, the process of manufacturing the MEMS device 20 is simplified, since the manufacturing of the displacement sensors 41A1, 41A2, 41B1, 41B2 may take place simultaneously (i.e., exploiting the same manufacturing steps and adapting the masks already used) with respect to the manufacturing of the piezoelectric actuator elements 38A1, 38A2, 38B1, 38B2. In other words, no additional manufacturing steps are needed, and this reduces the overall cost of the MEMS device 20.

Furthermore, the MEMS sensor 20 and the differential acquisition module 54 allow the movements of the tiltable structure 22 to be sensed with greater sensitivity with respect to the prior art, achieving measure sensitivities which are even higher than approximately 12 mV/deg. Furthermore, the use of the MEMS sensor 20 and the differential acquisition module 54 allows obtainment of a measure of the displacement of the tiltable structure 22 which is not affected by temperature variations.

The use of the first and third displacement sensors 41A1, 41B1, and of the second and fourth displacement sensors 41A2, 41B2 in series, as described in FIG. 4, allows the overall accumulation of charge to be increased due to a greater overall area of capacitor, while keeping the overall value of capacitance reduced (Cpsi is equal to the series of $C_{A1}$ and $C_{B1}$, and $C_{PS2}$ is equal to the series of $C_{A2}$ and $C_{B2}$).

Furthermore, the presence of the first and second integrated capacitors 65A and 65B, integrated in the semiconductor body 21, allows better control of the manufacturing tolerances of the feedback capacitors 67A and 67B as it allows the use, for the manufacturing of the feedback capacitors 67A and 67B, of the same MEMS technology manufacturing process from which the displacement sensors 41A1, 41A2, 41B1, 41B2 are made (instead of two distinct processes, the MEMS one and the electronic one, with manufacturing tolerances unrelated to each other). In addition, the integration of the feedback capacitors 67A and 67B in the semiconductor body 21 has the further advantage of exploiting, effectively and without requiring additional costs, an area of the semiconductor body 21 that otherwise would still be present but unused.

Finally, it is apparent that modifications and variations may be made to the devices described and illustrated herein without thereby departing from the scope of this disclosure.

For example, considering the embodiments of FIGS. 2 and 3, the displacement sensors 41A1, 41A2 may not be galvanically insulated with respect to the respective piezoelectric actuator elements 38A1, 38A2. In fact, the bottom electrodes 42c of the first displacement sensor 41A1 and of the first piezoelectric actuator element 38A1 may be in electrical contact with each other, as well as the bottom electrodes 42c of the second displacement sensor 41A2 and of the second piezoelectric actuator element 38A2. Similar considerations may be made by considering, instead of the bottom electrodes 42c, the top electrodes 42b.

Furthermore, the use of the displacement sensors 41A1, 41A2, 41B1, 41B2 as shown in FIG. 4 is not limited to the structure of the MEMS device 20 shown in FIG. 4, but may be similarly applied to the structure of the MEMS device 20 shown in FIG. 3.

The invention claimed is:

1. A MEMS device, comprising:
    a semiconductor body defining a cavity and forming an anchor portion;
    a tiltable structure elastically suspended over the cavity;
    first and second support arms extending along a rotation axis of the tiltable structure between the anchor portion and opposite sides of the tiltable structure; and
    first and second piezoelectric actuation structures facing opposite sides of the first support arm and extending between the anchor portion and part of the MEMS device, wherein said first and second piezoelectric actuation structures are biasable to deform mechanically, thereby generating a rotation of the tiltable structure around the rotation axis;
    wherein the first and second piezoelectric actuation structures carry first and second displacement sensors of piezoelectric type and being opposite to each other with respect to the rotation axis;
    wherein, when the tiltable structure rotates around the rotation axis due to actuation of the first and second piezoelectric actuation structures, the first and second displacement sensors are subject to respective mechanical deformations and generate first and second sensing signals in phase opposition to each other and being indicative of the rotation of the tiltable structure around the rotation axis; and
    wherein the first and second sensing signals are configured to be acquired in a differential manner.

2. The MEMS device according to claim 1, wherein the part of the MEMS device comprises said opposite sides of the first support arm.

3. The MEMS device according to claim 1, wherein the part of the MEMS device comprises the tiltable structure.

4. The MEMS device according to claim 1, wherein the first and second displacement sensors are electrically coupled to a differential acquisition module configured to acquire, in a differential manner, the first and second sensing signals and to generate, based upon the first and the second sensing signals, a differential signal indicative of the rotation of the tiltable structure around the rotation axis.

5. The MEMS device according to claim 4 wherein the differential acquisition module comprises a differential acquisition circuit including:
    a fully-differential amplifier having a positive input, a negative input, a negative output, and a positive output, the positive input being electrically coupled to the first displacement sensor and the negative input being electrically coupled to the second displacement sensor;
a first parallel circuit comprising a first feedback resistor and a first feedback capacitor, the first parallel circuit coupled between the positive input and the negative output; and
a second parallel circuit comprising a second feedback resistor and a second feedback capacitor, the second parallel circuit coupled between the negative input and the positive output;
wherein a differential voltage is generated between the negative output and the positive output in response to rotation of the tiltable structure around the rotation axis due to actuation of the first and second piezoelectric actuation structures, the differential voltage being said differential signal.

6. The MEMS device according to claim 5, wherein the first and second feedback capacitors are integrated in the semiconductor body.

7. The MEMS device according to claim 1,
wherein the first and second displacement sensors extend on respective top surfaces of the first and second piezoelectric actuation structures; and
wherein each of the first and the second displacement sensors comprises a respective piezoelectric layer interposed, orthogonally to the respective top surface, between a respective top electrode and a respective bottom electrode which is in contact with the respective top surface of the first or the second piezoelectric actuation structures.

8. The MEMS device according to claim 1,
further comprising third and fourth piezoelectric actuation structures which face opposite sides of the second support arm, extend between the anchor portion and said opposite sides of the second support arm or between the anchor portion and the tiltable structure, and are biasable to deform mechanically, thereby generating the rotation of the tiltable structure around the rotation axis;
wherein the third and fourth piezoelectric actuation structures carry third and fourth displacement sensors of piezoelectric type, which are opposite to each other with respect to the rotation axis; and
wherein, when the tiltable structure rotates around the rotation axis due to actuation of the first, the second, the third and the fourth piezoelectric actuation structures, the first, the second, the third and the fourth displacement sensors are subject to respective mechanical deformations and generate, respectively, the first, the second, a third, and a fourth sensing signals, the third and the fourth sensing signals being in phase opposition to each other and being indicative of the rotation of the tiltable structure around the rotation axis.

9. The MEMS device according to claim 8, wherein the first and third displacement sensors are electrically connected in series with each other, and wherein the second and the fourth displacement sensors are electrically connected in series with each other.

10. The MEMS device according to claim 9,
wherein the first and second displacement sensors extend on respective top surfaces of the first and second piezoelectric actuation structures;
wherein each of the first and the second displacement sensors comprises a respective piezoelectric layer interposed, orthogonally to the respective top surface, between a respective top electrode and a respective bottom electrode which is in contact with the respective top surface of the first or the second piezoelectric actuation structures;
wherein the third and the fourth displacement sensors extend on respective top surfaces of the third and fourth piezoelectric actuation structures;
wherein each of the third and the fourth displacement sensors comprises a respective piezoelectric layer interposed, orthogonally to the respective top surface, between a respective top electrode and a respective bottom electrode which is in contact with the respective top surface of the third or fourth piezoelectric actuation structures; and
wherein the bottom electrode of the first displacement sensor is electrically coupled to the top electrode of the third displacement sensor, and wherein the bottom electrode of the second displacement sensor is electrically coupled to the top electrode of the fourth displacement sensor.

11. The MEMS device according to claim 9,
wherein the first and second displacement sensors are electrically coupled to a differential acquisition module configured to acquire, in a differential manner, the first and second sensing signals and to generate, based upon the first and the second sensing signals, a differential signal indicative of the rotation of the tiltable structure around the rotation axis; and
wherein the first, the second, the third and the fourth displacement sensors are electrically coupled to the differential acquisition module which is configured to acquire, in a differential manner, the sum of the first and the third sensing signals and the sum of the second and the fourth sensing signals and to generate, on the basis of the sum of the first and the third sensing signals and on the basis of the sum of the second and the fourth sensing signals, said differential signal.

12. The MEMS device according to claim 10,
wherein the first and second displacement sensors are electrically coupled to a differential acquisition module configured to acquire, in a differential manner, the first and second sensing signals and to generate, based upon the first and the second sensing signals, a differential signal indicative of the rotation of the tiltable structure around the rotation axis; and
wherein the first, the second, the third and the fourth displacement sensors are electrically coupled to the differential acquisition module which is configured to acquire, in a differential manner, the sum of the first and the third sensing signals and the sum of the second and the fourth sensing signals and to generate, on the basis of the sum of the first and the third sensing signals and on the basis of the sum of the second and the fourth sensing signals, said differential signal.

13. The MEMS device according to claim 1,
wherein the first and the second piezoelectric actuation structures comprise first and second piezoelectric actuator elements of piezoelectric type, which are opposite to each other with respect to the rotation axis;
wherein the first displacement sensor and the first piezoelectric actuator element are galvanically insulated from each other; and
wherein the second displacement sensor and the second piezoelectric actuator element are galvanically insulated from each other.

14. The MEMS device according to claim 7,
wherein the first and the second piezoelectric actuation structures comprise first and second piezoelectric actuator elements of piezoelectric type, which are opposite to each other with respect to the rotation axis;

wherein the first and the second piezoelectric actuator elements extend on the respective top surfaces of the first and second piezoelectric actuation structures;

wherein each of the first and second piezoelectric actuator elements comprises a respective piezoelectric layer interposed, orthogonally to the respective top surface, between a respective top electrode and a respective bottom electrode which is in contact with the respective top surface of the first or, respectively, the second piezoelectric actuation structures; and wherein the bottom electrodes or the top electrodes of the first displacement sensor and the first piezoelectric actuator element are electrically coupled to each other, and wherein the bottom electrodes or the top electrodes of the second displacement sensor and of the second piezoelectric actuator element are electrically coupled to each other.

15. The MEMS device according to claim 1, wherein the first and the second piezoelectric actuation structures are of resonant type;

wherein the tiltable structure has a main extension in a horizontal plane defined by first and second horizontal axes perpendicular to each other, the first horizontal axis being parallel to the rotation axis;

wherein the first support arm comprises first and second torsional springs rigid to movements outside the horizontal plane and yielding to torsion around the rotation axis, the first torsional spring being coupled to the tiltable structure, the second torsional spring being coupled to the anchor portion, the first and the second torsional springs being mutually coupled at a first constraint region; and wherein the first and the second piezoelectric actuation structures extend between the anchor portion and the first constraint structure, on the respective opposite sides of the first support arm.

16. The MEMS device according to claim 1, wherein the first and the second displacement sensors are configured to be biased with a direct common mode voltage.

17. An electronic apparatus comprising a MEMS device with the differential acquisition module according to claim 4.

18. The electronic apparatus according to claim 17, further comprising a biasing module coupled to the differential acquisition module and to the first and the second piezoelectric actuation structures, the biasing module configured to:

receive, from the differential acquisition module, a displacement signal correlated to the differential signal;

generate, based on the displacement signal, actuation signals; and bias, through the actuation signals, the first and second piezoelectric actuation structures.

19. A method of using a MEMS device comprising a semiconductor body defining a cavity and forming an anchor portion, a tiltable structure elastically suspended on the cavity, first and second support arms extending between the anchor portion and opposite sides of the tiltable structure along a rotation axis of the tiltable structure, and first and second piezoelectric actuation structures facing opposite sides of the first support arm, extending between the anchor portion and said opposite sides of the first support arm or between the anchor portion and the tiltable structure and being biasable to deform mechanically to thereby generate a rotation of the tiltable structure around the rotation axis, wherein the first and second piezoelectric actuation structures carry first and second displacement sensors of piezoelectric type and being opposite to each other with respect to the rotation axis, the method comprising:

biasing the first and the second piezoelectric actuation structures to generate rotation of the tiltable structure around the rotation axis; and acquiring, in a differential manner, first and second sensing signals generated by the first and second displacement sensors.

20. The method of claim 19, wherein the first and second sensing signals are acquired using a differential acquisition module that generates, based upon the first and the second sensing signals, a differential signal indicative of the rotation of the tiltable structure around the rotation axis.

21. The method of claim 20, further comprising, when the tiltable structure rotates around the rotation axis due to actuation of the first and second piezoelectric actuation structures, generating a differential voltage between a negative output and a positive output of a fully-differential amplifier having positive input, a negative input, the negative output, and the positive output, the positive input being electrically coupled to the first displacement sensor and the negative input being electrically coupled to the second displacement sensor.

* * * * *